April 1, 1969     L. F. NORDONE     3,435,593
GAS CLEANING PROCESS AND APPARATUS
Filed April 21, 1967
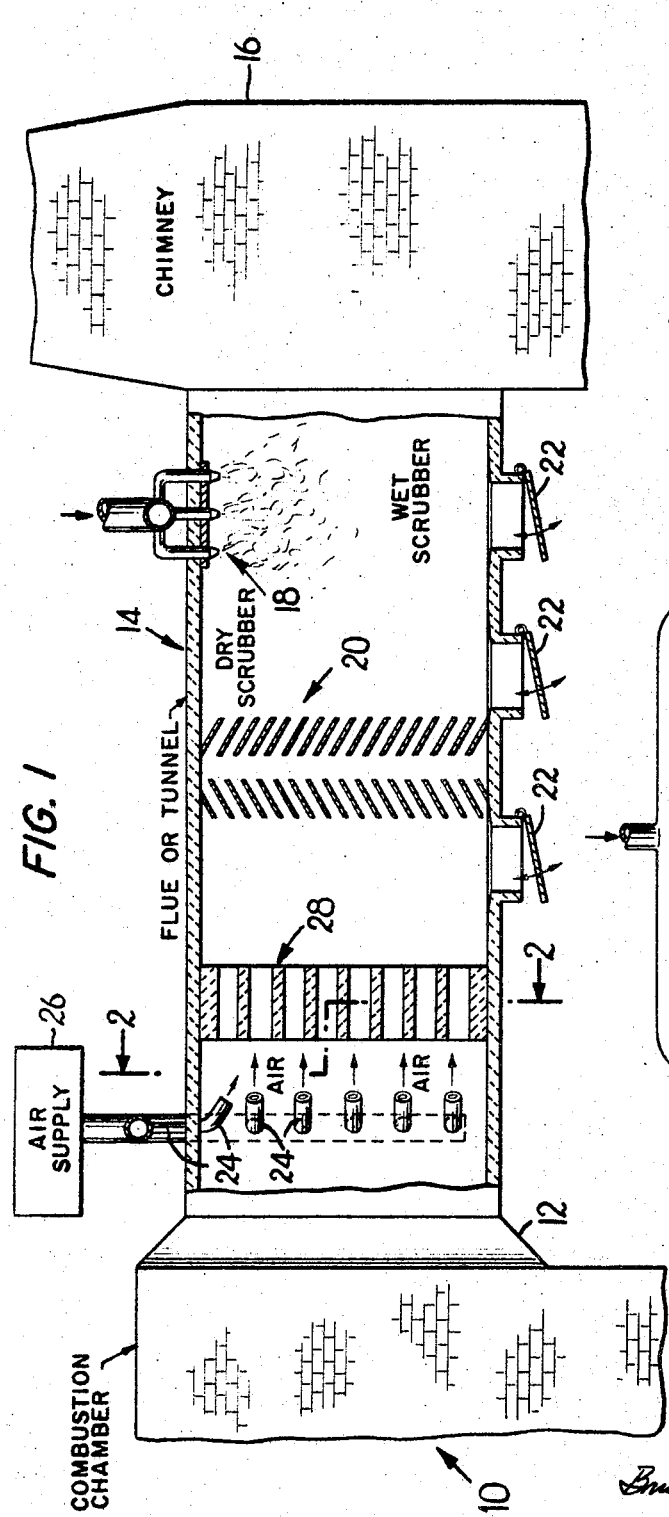
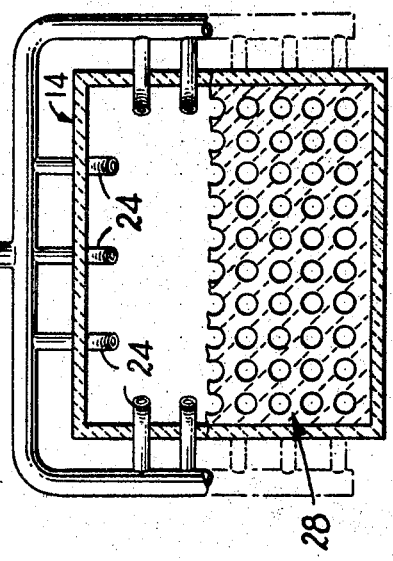
INVENTOR.
LOUIS F. NORDONE
BY
his ATTORNEYS

United States Patent Office 3,435,593
Patented Apr. 1, 1969

3,435,593
GAS CLEANING PROCESS AND APPARATUS
Louis F. Nordone, 300 Hayward Ave.,
Mount Vernon, N.Y. 10552
Filed Apr. 21, 1967, Ser. No. 632,660
Int. Cl. B01d 51/10
U.S. Cl. 55—84        7 Claims

ABSTRACT OF THE DISCLOSURE

In a method of removing fly ash and the like from a flue gas in which the flue gas is caused to flow through one or more gas cleaning devices located in the flue, or tunnel, the step of introducing into the flue upstream of the cleaning devices and within about the first one-third of the length of the flue, a relatively small proportion of cool, dry air in an amount effective to reduce turbulence in the flue gas flow, but not in an amount so high that natural draft is reduced below that required for the effective removal of the flue gas from the combustion chamber being served. The air introduced into the flue should have a temperature not greater than 70° F. and a dew point not greater than 55° F., and the quantity of air introduced is usually in the range of between 5% and 20%, by weight, of the flue gas.

Background of the invention

This invention relates to a gas cleaning process and apparatus and, more particularly, to a process for conditioning flue gas for more effective removal of the fly ash and apparatus for carrying out the process.

Public attention and concern is becoming increasingly directed to the problem of air pollution. In numerous densely populated urban areas around the world, the quality of the air is deteriorating rapidly. The sources of pollution are well known, and efforts by government and industry to reduce to a minimum the discharge of pollutants into the atmosphere are being stepped up. However, efforts in this direction generally involve the installation of expensive gas cleaning devices, and the progress is therefore exceedingly slow.

An important atmosphere pollutant occurs in the form of particulate materials, such as the fly ash from the effluent gases of combustion processes. The most important sources of fly ash pollutants are incinerators and steam generators, especially those used in electric power plants. Although many small-sized incinerators and steam generators have little if any effective pollution control devices, most large units in these categories are equipped with complex and expensive gas cleaning devices, including various types of dry scrubbers, wet scrubbers and electric precipitators. However, the effectiveness of these devices in removing fly ash is far from complete.

Generally, the common types of dry scrubbers, such as louvered inertial separators, remove only about 90% of particles that are larger than 10 microns in size and remove even smaller percentages of particles less than 10 microns. Conventional wet scrubbers, such as spray towers, have comparable efficiency. Electric precipitators do a somewhat better job than either dry or wet scrubbers, but they still permit a significant amount of particulate material to be discharged into the atmosphere. The nuisance value and pollution hazard of fly ash in the atmosphere is generally recognized to increase in approximately geometrical proportion as the size of particles decreases. Accordingly, an improvement of even a few percent by weight in the removal of particles less than 10 microns in size is of considerable importance.

Summary of the invention

There is provided, in accordance with the invention, a novel and improved gas cleaning process and an apparatus for carrying out the process which affords a substantial improvement in the efficiency of removal of particulate materials by any of the well known gas cleaning devices. More particularly, the invention is concerned with the conditioning of the effluent gases of a combustion process in a manner such that gas cleaning devices, including wet and dry scrubbers and electric precipitators, operate with surprisingly improved efficency.

More particularly, the invention resides in the step of introducing into the flue or tunnel which leads from the combustion chamber to the chimney a small proportion, with respect to the quantity of flue gas, of cool, dry air, the air being introduced in approximately the first one-third of the tunnel and preferably near the entrance to the tunnel. Generally, the temperature of the air should be not greater than about 70° F. and the moisture content should be such that the air has a dew point of not in excess of about 55° F. Generally, it is sufficient to introduce the air at a rate of from about 5% to about 20%, by weight, of the rate of flow of the effluent gases passing The theory upon which the invention operates to improve the efficiency of fly ash removal by conventional gas cleaning devices is not thoroughly understood. It is theorized, however, that at least two important changes take place in the originally violently turbulent, fly ash laden flue gas entering the tunnel.

First of all, the introduction of cool, dry air reduces the turbulence markely to an extent that a condition approaching laminar flow is established in the tunnel. The gas flow as it enters the part of the tunnel containing the gas cleaning devices can be referred to as "quasi-laminar" flow because it may be attained in tunnels in which conditions are such that the Reynolds number is well above 2200, whereas it is generally believed that laminar flow cannot be established or maintained at a Reynolds number above 2200. The quasi-lmainar flow established by introducing cool, dry air into the flue tunnel at or near the entrance to it is obtained despite the fact that conditions in most tunnels, those of incinerators and steam generators, for example, are such that they calculate to a Reynolds number far above 2200.

The establishment of a flow condition resembling laminar gas flow in the tunnel, as compared with normally turbulent flue gas flow, is believed to significantly reduce the velocity of entrained fly ash particles and thus facilitate their removal by wet and dry scrubbers or other gas cleaning devices.

Another possible explanation for the increased efficiency of fly ash removal obtained by the gas conditioning process of the invention is that the conditions in a combustion chamber tend to impart negative charges to the surfaces of fly ash particles. However, the introduction of cool, dry air into the effluent gases from the combustion chamber modifies the surface charges of the charged particles so that they are no longer repelled by other particles in the flue gas and can more readily precipitate out. Moreover, the ability of the particles to coalesce, and thereby to precipitate out more readily, is also enhanced.

The foregoing theories, because they are at present only theories and remain to be proven, are not to be considered as limiting the concept of the invention. In any event, the flue gas conditioning process of the invention has been found to considerably improve the efficiency of operation of dry scrubbers, wet scrubbers and precipitators such that a high percentage of particles smaller than those normally removed by such conventional cleaning devices and a greater amount by weight of the fly ash particles are removed. It is believed to be possible to remove 90% or more of particles that are larger than 1 micron and 95% of particles that are larger than 5 microns in size when the process of the invention is embodied in a gas cleaning system employing dry and wet scrubbers in series. When the invention is used with an electrical precipitator, removal of 99% of particles larger than one-tenth micron in size should be possible. In all instances, the percentages are by weight.

*Brief description of the drawings*

For a better understanding of the invention, reference may be made to the following description of an exemplary embodiment, taken in conjunction with the figures of the accompanying drawing, in which:

FIG. 1 is a schematic illustration in longitudinal cross-section of a tunnel having equipment for carrying out the invention and exemplary gas cleaning devices installed in it; and FIG. 2 is a schematic transverse cross-section of the tunnel of FIG. 1 taken generally along the lines 2—2 of FIG. 1 and looking in the direction of the arows.

*Description of an exemplary embodiment*

Referring to the drawings, the reference numeral 10 designates the combustion chamber of an incinerator, boiler or the like (shown only in part) which includes an outlet 12 leading to a substantially horizontal flue or tunnel 14 by which the gases emanating from the combustion process in the chamber 10 are conducted into a chimney 16. The flue or tunnel 14 may take various forms, but in the embodiment illustrated in the drawings, it is generally rectangular in cross-section (see FIG. 2).

Installed near the downstream end of the tunnel 14 is a wet scrubber (e.g., a spray tower) which is shown schematically and designated by the reference numeral 18. Upstream from the wet scrubber 18 is a dry scrubber 20, also shown schematically, such as a louvered, inertial separator. The wet scrubber 18 and dry scrubber 20 may be of any suitable types, and it might be mentioned at this point that the invention is in many instances readily applicable to existing gas cleaning systems with a minimum of modification and at very low cost. In the lower wall of the tunnel 14 are sumps 22 in which the fly ash precipitating out of the gas flowing through the tunnel are accumulated and periodically removed.

In accordance with the invention, the gases flowing from the combustion chamber through the tunnel are conditioned by introducing cool, dry air into the tunnel at a point near its entrance. More particularly, the air is preferably introduced through a series of conduits 24 which are spaced around the perimeter of the tunnel and which are arranged to direct streams of air generally toward the axis of the tunnel and in the direction of the gas flow through it. The air is delivered in a predetermined quantity from an air supply 26, which is shown schematically inasmuch as various well known devices can be employed. The gases flowing from the combustion chamber are highly turbulent as they enter the tunnel 14, but upon mixing with the air delivered from the supply 26 through the conduits 24, the flow tends to become laminar, or at least to resemble laminar flow. To assist in establishing and maintaining a laminar flow condition through the tunnel, it is preferable to include a baffle arrangement 28 near the entrance to the tunnel, but downstream from the air conduits 24. An appropriate form of baffle, as shown in FIG. 2, is built up of a series of tubular pipes which are aligned with the axis of the tunnel and provide a plurality of individual flow passages disposed axially of the tunnel.

It is believed to be of some importance that the gas conditioning stage, which includes the conduits for introducing cool, dry air into the gas flow and the baffles, should be located within approximately the first one-third of the length of the flue tunnel, so that flow conditions resembling laminar flow can be established well upstream from the gas cleaning devices.

Generally, good results are obtained by introducing cool, dry air into the tunnel at a rate of between about 5% and about 20% by weight of the rate of combustion effluent gas flow through the tunnel, but it may sometimes be appropriate to introduce greater amounts to obtain more effective results. In any event, however, the amount of cool, dry air introduced should not be so great that the natural draft is reduced to an extent adversely affecting the combustion process and the removal of combustion gases from the combustion chamber 10. Preferably, moreover, the air should have a temperature not in excess of 70° F. and a moisture content providing a dew point not in excess of 55° F. Generally, the efficiency of particle removal is improved as the temperature and moisture content of the air introduced into the tunnel are reduced.

The air supply 26 for the tunnel 14 varies somewhat according to the environmental conditions. In colder climates where winter air is normally cold and dry, it is appropriate to provide blowers, which may be equipped with suitable air flow rate controls, to supply the air for introduction through the air conduits 24 during the winter. On the other hand, where the environmental air is not of sufficiently low temperature, moisture content or both, air refrigeration and dehumidification apparatus can be utilized to reduce the temperature, moisture content or both, to appropriate levels needed to obtain effective results.

Following the introduction of air into the tunnel and the passage of the mixture of air and combustion effluent gases through the baffle system, the flow conditions through the wet and dry scrubbers and any other gas cleaning apparatus that may be provided, closely resemble laminar flow. Accordingly, the dry scrubber 20 and wet scrubber 18 will operate with improved efficiency, and, moreover, a greater amount of fly ash will precipitate out of the gas stream independently of the cleaning action of the scrubbers 18 and 20.

Thus there is provided, in accordance with the invention, a novel and improved gas cleaning process, and an apparatus for carrying out the process in which considerable improvements are obtained in the removal of particulate pollutants from the effluent gases of a combustion process. The invention makes it possible to obtain such improvements in most existing systems with only relatively minor modification and with a minimum of capital investment. However, it is considered that regardless of the cost advantage, the advantage to the public provided by the invention of improving the cleanliness of the air far outweighs any economic advantage.

The above-described embodiment of the invention is intended to be merely exemplary, and those skilled in the art will be able to make numerous variations and modifications of it without departing from the spirit and scope of the invention. All such variations and modifications are intended to be included within the scope of the invention as defined in the appended claims.

I claim:

1. In a method of removing fly ash and the like from a flue gas in which the flue gas is caused to flow through one or more gas cleaning devices located in the flue, the steps of introducing into the flue upstream from the cleaning devices and within about the first one-third of the length of the flue cool, dry air in an amount of from about 5% to about 20%, by weight, of the flue gas, and breaking up the gas flow near the end of the said first one-third into individual flow streams, thereby to reduce turbulence in the gas flow without reducing natural draft below that required for the effective removal of the flue gas from the combustion chamber being served, whereby the efficiency of fly ash removal by the cleaning devices is substantially improved.

2. A method according to claim 1 wherein the temperature of the air introduced into the flue is not greater than about 70° F.

3. A method according to claim 1 wherein the dew point of the air is not greater than about 55° F.

4. A method according to claim 1 wherein the temperature of the air introduced into the flue is not greater than about 70° F. and the dew point of the air introduced into the flue is not greater than about 55° F.

5. In a flue or tunnel for conducting the gaseous effluents from a combustion chamber to a chimney or the like, the tunnel including gas cleaning devices for removing fly ash from the effluent gases, the combination therewith of apparatus for conditioning the effluent gas to remove the fly ash therefrom with substantially greater efficiency comprising a gas conditioning section located a substantial distance upstream from the cleaning devices and constituted by generally the first one-third of the tunnel, baffles located in the gas conditioning section for reducing the turbulence in the effluent gases before they flow through the gas cleaning devices and means in the gas conditioning section upstream from the baffles for introducing into the effluent gas flow, cool, dry air in the amount of from about 5% to about 20%, by weight, of the flue gas, thereby to reduce turbulence in the flue gas flow without reducing natural draft below that required for effective removal of the flue gas from the combustion chamber being served.

6. Apparatus according to claim 5 wherein the means for introducing the air into the effluent gas includes a plurality of spaced-apart inlet conduits distributed around the perimeter of the tunnel and arranged to direct gas streams in a generally inward and downstream direction relative to the effluent gas flow.

7. Apparatus according to claim 5 wherein the baffles include a gridwork located adjacent to the entrance to the flue tunnel and defining a plurality of separate flow passages disposed parallel to the axis of the tunnel.

References Cited

UNITED STATES PATENTS

| 1,365,790 | 1/1931 | Ross | 55—90 |
| 1,639,179 | 8/1927 | Hamel | 261—17 |
| 2,998,097 | 8/1961 | Baxter | 55—258 |
| 3,259,083 | 7/1966 | Evans. | |

REUBEN FRIEDMAN, *Primary Examiner.*

CHARLES N. HART, *Assistant Examiner.*

U.S. Cl. X.R.

55—260

UNITED STATES PATENT OFFICE
CERTIFICATE OF CORRECTION

April 1, 19

Patent No. 3,435,593

Louis F. Nordone

It is certified that error appears in the above identified patent and that said Letters Patent are hereby corrected as shown below:

Column 2, line 24, after "passing" insert -- from the combustion chaml to the flow. --; line 33, "markely" should read -- markedly --; line 42, "lamainar" should read -- laminar --. Column 3, line 25, "arows" should read -- arrows --. Column 6, line 16, "1/1931" should read -- 1/1921 --; line 19, after "Evans" insert -- ----- 110-8a --.

Signed and sealed this 7th day of April 1970.

(SEAL)
Attest:

Edward M. Fletcher, Jr.
Attesting Officer

WILLIAM E. SCHUYLER,
Commissioner of Pat(